United States Patent [19]

Rix et al.

[11] Patent Number: 5,292,072
[45] Date of Patent: Mar. 8, 1994

[54] FUEL INJECTORS AND METHODS FOR MAKING FUEL INJECTORS

[75] Inventors: David M. Rix, Columbus; Christine M. Yingling, North Vernon, both of Ind.

[73] Assignee: Cummins Engine Company, Inc., Columbus, Ind.

[21] Appl. No.: 92,276

[22] Filed: Jul. 15, 1993

Related U.S. Application Data

[63] Continuation of Ser. No. 944,435, Sep. 14, 1992, abandoned, which is a continuation of Ser. No. 501,023, Mar. 29, 1990, Pat. No. 5,192,026.

[51] Int. Cl.⁵ ............................................ F02M 61/18
[52] U.S. Cl. .................................... 239/533.3; 239/584
[58] Field of Search ............... 239/533.2, 533.3, 533.9, 239/533.12, 584

[56] References Cited

U.S. PATENT DOCUMENTS

| | | | |
|---|---|---|---|
| 3,511,442 | 5/1970 | DeLuca et al. | 239/584 X |
| 4,250,011 | 2/1981 | Capello et al. | |
| 4,658,824 | 4/1987 | Scheibe | 239/533.3 |
| 4,903,896 | 2/1990 | Letsche et al. | 239/533.9 |
| 4,909,440 | 3/1990 | Mitsuyasu et al. | 239/533.9 |
| 5,059,289 | 10/1991 | Gaskell . | |

FOREIGN PATENT DOCUMENTS

| | | |
|---|---|---|
| 0363142 | 4/1990 | European Pat. Off. . |
| 0390550 | 10/1990 | European Pat. Off. . |
| 3032735 | 4/1982 | Fed. Rep. of Germany ............ 239/533.12 |
| 762684 | 12/1956 | United Kingdom ............ 239/533.3 |
| 2097858 | 11/1982 | United Kingdom ............ 239/533.2 |

OTHER PUBLICATIONS

Motortechnische Zeitschrift, 1977.

*Primary Examiner*—Andres Kashnikow
*Assistant Examiner*—William Grant
*Attorney, Agent, or Firm*—Woodard, Emhardt, Naughton Moriarty & McNett

[57] ABSTRACT

Fuel injector for an internal combustion engine which has a timing chamber bore in its body intersecting at an acute angle with an auxiliary bore. These bores are fuel-receiving passages exposed to the pressure of injection. A radiused intersection between the walls of the respective bores reduces the concentration of stress within the fuel injector, allowing the injector to withstand the high injection pressures of mechanical pressurization. An electrochemical machining method and fixture for machining the intersection between the bores of a fuel injector body or other workpiece is also disclosed.

4 Claims, 3 Drawing Sheets

FUEL INJECTORS AND METHODS FOR MAKING FUEL INJECTORS

This application is a continuation of application Ser. No. 07/944,435, filed Sep. 14, 1992, now abandoned, which is a continuation of application Ser. No. 07/501,023, filed Mar. 29, 1990, now U.S. Pat. No. 5,192,026.

FIELD OF THE INVENTION

The present invention relates to fuel injectors for internal combustion engines, and more specifically to improved bodies for such fuel injectors and methods for manufacturing them.

BACKGROUND OF THE INVENTION

Many motor vehicle engines, whether compression ignition or spark ignition engines, are provided with electronic fuel injection systems to satisfy the need for precise and reliable fuel delivery into the cylinders of the engines. Such precision and reliability are demanded to address the goals of increasing fuel efficiency, maximizing power output, and controlling undesirable products of combustion.

Several electronic fuel injection systems designed for internal combustion engines use a mechanical linkage from the engine to pressurize the fuel charge. Using mechanical pressurization, an extremely high injection pressure, now often exceeding 20,000 psi (13,800 Newtons per square centimeter) and occasionally reaching a transient peak value of 23,500 psi (16,200 Newtons per square centimeter), is developed within the timing chamber of the injector. A higher fuel injection pressure provides a cleaner exhaust because particulate emissions are reduced, and so is desirable to meet the tightened emission standards which are being and will be imposed on motor vehicles.

One problem preventing the achievement of higher injection pressures in a practical engine is premature failure of the injector body when such pressures are applied. Some bores of the body are exposed to the full preinjection and injection pressure, as well as the high mechanical stresses of moving parts in the injector. The typical life of an injector body is unacceptably reduced when fuel injection pressures exceeding 20,000 psi (13,800 Newtons per square centimeter) are routinely applied within the timing chamber.

Electrochemical machining is a known method for forming workpieces, particularly metal workpieces. A conventional electrochemical machining head comprises a supply of an electrically conductive fluid for application to the workpiece, electrodes communicating with the fluid supply and workpiece for creating an electrical current between the fluid and the workpiece, and a mask for confining the flow of the fluid to the material of the workpiece to be removed. Electrochemical machining has not been employed to address the problem of fuel injector body failure resulting from high fuel injection pressure.

SUMMARY OF THE INVENTION

One aspect of the present invention is recognition that the known injector body is prone to failure because the walls of the bores defining the timing chamber and the control passage intersect at a sharp edge, having a very small radius, particularly where the angle between the walls of the respective bores is smallest. This problem is solved by providing an enlarged radius where the angle between the respective bore walls is most acute. The resulting injector body can withstand the fluid pressure and mechanical stresses encountered in high pressure fuel injectors without premature failure.

The intersection between the two bores of the injector body, though difficult to reach from outside the body, is readily, accurately and economically radiused by electrochemical machining. The first step of the machining method is providing a partially formed injector body (or more broadly, an article) having first and second bores which intersect at an acute angle. The intersection of the bores defines a chamber within the body.

Next, an electrochemical machining head is inserted in the chamber through one of the bores. The electrochemical machining head includes a specially adapted mask which is positioned between a source of an electrolyte and the walls of the bores in a predetermined, fixed position. The mask confines the impingement of the electrolyte to the region to be radiused.

At least a portion of the intersection between the walls of the bores is machined with the electrochemical machining head to provide an increased blend radius between the intersecting walls. The electrochemical machining head is then withdrawn from the chamber.

DETAILED DESCRIPTION OF THE INVENTION

While the invention is described in connection with certain preferred embodiments, it should be understood that it is not intended to be limited to those embodiments illustrated. On the contrary, all alternatives, modifications, and equivalents as may be included within the spirit and scope of the invention as defined by the appended claims are intended to be protected.

Figure 1:
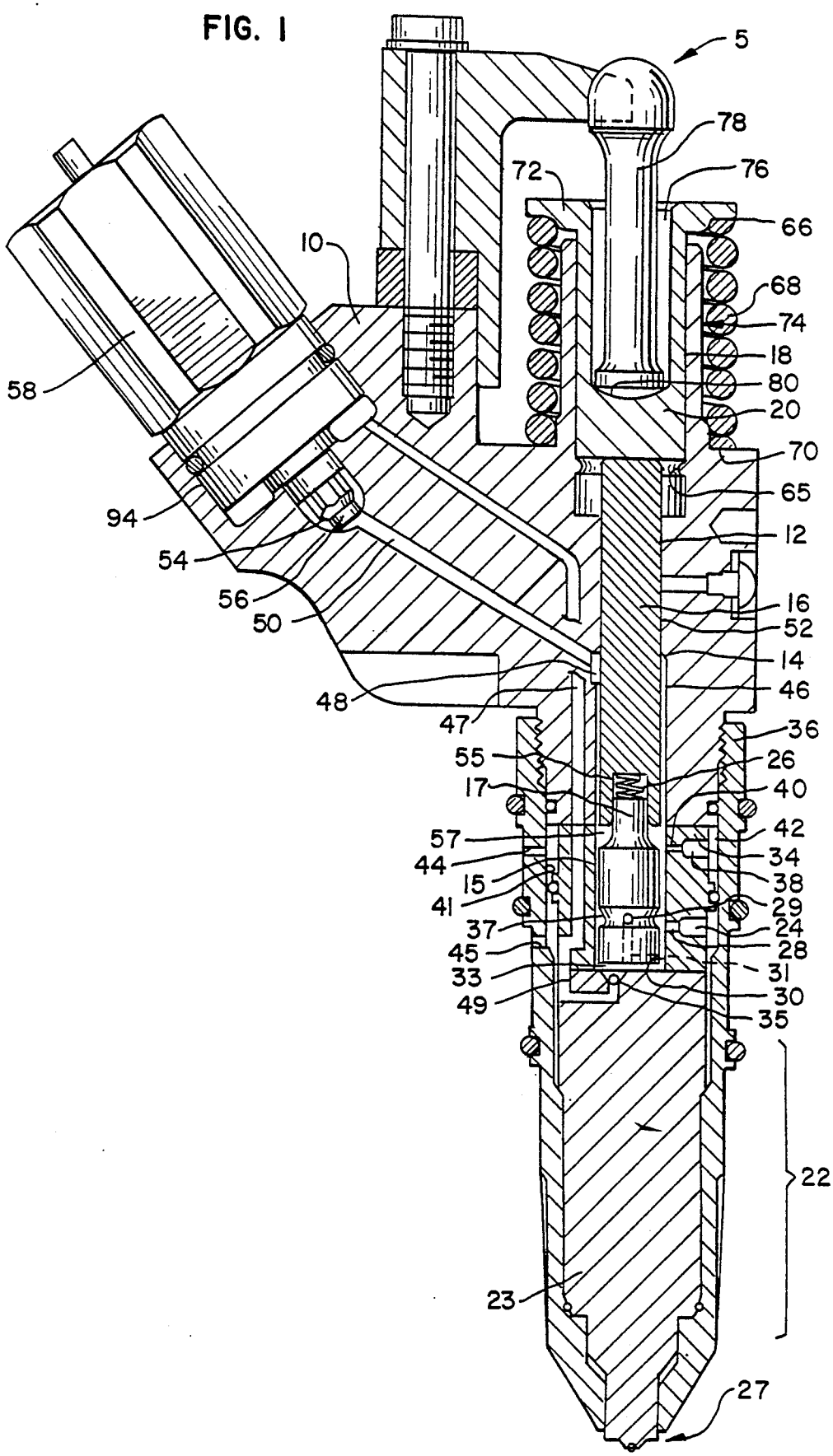
FIG. 1 is a cross-section of a high pressure fuel injector according to the present invention.

FIG. 1 illustrates the overall configuration of a mechanically assisted electronic fuel injection assembly 5.

The injector body 10 is formed preferably as a forged unit, and a central axial cavity 12 extends throughout the length of the injector body 10. The axial cavity 12 is actually comprised of two coaxial and communicating central cylindrical bores of differing inner diameters. The first cylindrical bore 14 is provided in the injector body 10 and slidingly receives a timing plunger 16. The second cylindrical bore 18 slidingly receives a coupling member 20. The cylindrical bores 14 and 18 are illustrated in the collapsed state. A metering plunger 17 is slidingly received in a central cylindrical bore 15 formed in the metering barrel 34.

A metering spill orifice 28 is provided within the metering barrel 34 and allows selective passage of fuel ultimately between the metering plunger chamber 33 and the typical fuel rail (not shown) which extends across the cylinder and allows the passage of fuel from a tank or storage vessel to the injector. A metering spill port orifice 28 and metering spill port 24 are located on the side wall 30 of the metering barrel 34. The metering barrel 34 is also provided with a timing spill orifice 40 located on the side wall 30 of the metering barrel 34, and a timing spill port 38 which allow selective fuel transportation between the timing plunger chamber 26, a timing spill edge 57, a timing spill port 38, and a return channel 42. The return channel 42, forming an annular cavity on the interior surface 41 of the nozzle retainer 36, is in communication with the return port 44 and the typical fuel return circuit (not shown) directing fuel back to the fuel tank under low pressure.

Fuel is provided to the metering plunger chamber 33 and the control chamber 54 via a fuel inlet port 45, a control valve fuel inlet passage 47, and a metering fuel inlet passage 49. Fuel flows selectively through the inlet passage 49 into the metering plunger chamber 33 through a check ball 35. Fuel also flows through the inlet passage 47 to the control chamber 54 for selective flow ultimately to the timing plunger chamber 26 through a control valve 56. Fuel is provided to the timing plunger chamber 26 via the timing plunger central passage 46, which extends as an annular passage formed between the central cylindrical bore 14 and the timing plunger 16. The passage 46 is in further communication with a control orifice 48 located on the side wall 52 of the first cylindrical central bore 14. The control orifice 48 provides communication to a control passage or bore 50, which in turn is in selective communication with a control chamber 54 via a control valve assembly 56. The valve assembly 56 is directly controlled by a control solenoid 58 in a manner which is well known. The inclined or angular position of the control solenoid 58 with respect to the central axis of the injector body 10 allows the control passage 50 to be drilled or machined through the boss or opening 94 in the injector body 10 which receives the control solenoid 58. This structure eliminates the need for additionally drilling or machining orifices in the external surface of the injector body 10, which must be subsequently sealed with high pressure plugs.

In its downward or injection stroke position, the timing plunger 16 protrudes into the lower or base portion of the second central cylindrical bore 18 but is not mechanically coupled to the coupling member 20. The coupling member 20 abuts with the timing plunger 16 and only a compressive load is transferred from the coupling member 20 to the timing plunger 16.

The coupling member 20 is equipped with an annular stop 65, located at the bottom end of the coupling member 20. The stop 65 limits the translation or movement of the coupling member 20 in the direction of the injection stroke. Extending further radially outward on the flange 72 is a spring seat 66, through which a return spring 68 acts upon the coupling member 20 to bias the coupling member 20 in the direction of the upward or metering stroke. The opposite end of the return spring 68 acts upon a spring seat 70, located on the injector body 10 at the base of the collar 74.

At the exposed end of the coupling member 20, a pocket 76 and a bearing surface 80 are formed, which allows a link 78 to transmit a force upon the coupling member 20 against the force created by the return spring 68 during the injection stroke. The link 78 functions in a well known fashion, and is typically in contact with the valve train camshaft (not shown), and reciprocates along the central axis of the injector assembly 5 in response to the angular position of the actuating cam (not shown). Thus, rotational motion of the camshaft is converted into reciprocal motion of the injector assembly 5 axial components so as to provide force useful in pressurizing the timing plunger chamber 26 and metering plunger chamber 33.

The operation of the injector assembly 5 requires fuel to be supplied via the control valve 56, the passage 50, the orifice 48 and the channel 46 to the timing plunger chamber 26 and via the metering fuel inlet passage 49 and the check ball 35 to the metering plunger chamber 33 at a predetermined delivery fuel pressure of 150 psi. Immediately prior to the initiation of the injection stroke, the control valve 56 is open, the metering chamber 33 has been filled to the predetermined volume of fuel at 150 psi via the passage 49 and the check valve 35, the timing plunger chamber 26 has been filled with a balancing fuel at 150 psi via the control valve 56, the passage 50, the orifice 48 and the passage 46, and the metering plunger 17 is suspended in place between the metering plunger chamber 33 and the timing plunger chamber 26. As the control valve 56 is open, fuel flow is allowed back from the timing plunger chamber 26 through the passage 46, the orifice 48, the passage 50 and the control valve 56 ultimately into the fuel rail system, thereby allowing a constant pressure in the timing plunger chamber 26 to be maintained by preinjection backflow.

As the injection cycle begins, the valve train cam acts on the link 78 to displace it toward the coupling member 20. In response, the coupling member 20 contacts the timing plunger 16 with a compressive force and displaces the timing plunger 16 into the timing plunger chamber 26 and causes preinjection backflow of fuel as described above as the timing plunger 16 begins to displace fuel in the timing plunger chamber 26. The return spring 68 is simultaneously compressed and a restoring force is generated against the coupling member 20.

As the timing plunger 16 continues its travel, a signal is sent to the control solenoid 58 at a predetermined crankshaft angle, causing the control valve 56 to close. With the control valve 56 closed, fuel is no longer allowed to flow out of the timing plunger chamber 26, through the orifice 48, the passage 50 and the control valve 56 into the control chamber 54, and ultimately through the passage 47 and the port 45 back to the fuel rail. Thus, preinjection backflow is terminated and the metering plunger 17 is no longer suspended in place. Also, closing the control valve 56 causes the pressure in the timing plunger chamber 26 to increase, creating a hydraulic link in the timing plunger chamber 26 and a force upon the metering plunger 17, which tends to increase the pressure in the metering chamber 33. Pressurization increases until about 5000 psi (3450 N/cm$^2$) is reached in both chambers. When 5000 psi (3450 N/cm$^2$) is reached, communication via well known means is established with the nozzle 27 and injection is initiated. Initially, the flow at the nozzle 27 is low at about 5000 psi (3450 N/cm$^2$). Thereafter, the timing plunger chamber 26 and metering plunger chamber 33 pressures continue to increase, generally to about 20,000 psi (13,800 N/cm$^2$) (although transient pressures of 23,500 psi (16,200 N/cm$^2$) are not uncommon). Injection continues at high pressure until the end of the injection stroke is reached.

At the completion of the injection stroke, the timing spill edge 57 and the metering spill edge 37, located on the metering plunger 17, pass over the timing spill orifice 40 and the metering spill orifice 28. The metering plunger 17 is further provided with a metering passage 31, which provides communication between the metering spill port 24 and the metering plunger chamber 33. Thus, as the spill edges coincide with the spill orifices, the residual pressure existing in the two chambers is relieved.

After the injection event, the valve train camshaft continues its rotation and the cam allows the link 78 to move away from the coupling member 20. The coupling member 20 and the link 78 are then urged to follow the cam profile due to the force generated in the compressed return spring 68 acting on the coupling member 20 through the spring seat 66 and the flange 72. Since the timing plunger 16 is not physically connected to the coupling member 20, as the coupling member 20 is urged upward in a generally vertical direction away from the nozzle assembly 22 of the injector assembly 5, the timing plunger 16 is not forced to follow by the coupling member 20. The timing plunger 16 is free to translate or move independently of the coupling member 20. The timing plunger 16 is urged toward the coupling member 20 against gravity only by the pressure of the fuel delivered to the metering plunger chamber 33 at the fuel rail pressure of 150 psi. The pressure existing in the fixed volume of the timing plunger chamber 26 is increased by the metering plunger chamber 33 pressure acting on the lower surface area of the metering plunger 17 defining a portion of the metering plunger chamber 33. The pressure increase on the fixed volume of the timing plunger chamber 26 acts on the lower surface area of the timing plunger. Thus, the timing plunger 16 is urged to move in an upward or vertical direction to maintain contact with the coupling member 20. The metering check ball 35, located on the surface of the nozzle spacer 23 exposed to the metering plunger chamber 33, opens to a slight gap between the metering barrel 34 and the nozzle spacer 23. This gap allows incoming fuel at the fuel rail pressure of 150 psi to enter and expand the metering plunger chamber 33. Thus, the metering plunger 17 is urged to maintain contact by hydraulic pressures with the timing plunger 16, and the timing plunger 16 is caused to move upward through the injector body by the pressure of the fuel delivered into the timing plunger chamber 26 and metering plunger chamber 33.

As the coupling member 20 and the timing plunger 16 continue their respective and independent upward motion, the control valve 56, which had been closed for a portion of the injection stroke, is caused to open by the actuation of a control solenoid 58. The timing of the opening of the control valve 56 is established by the desired quantity of fuel allowed into the metering plunger chamber 33. Once the control valve 56 is opened, fuel flow at the fuel rail pressure of 150 psi is allowed into the timing plunger chamber 26. As the fuel pressure in both the metering plunger chamber 33 and the timing plunger chamber 26 is equal, the pressure forces acting on the metering plunger 17 in both the upward and downward axial direction are balanced and motion of the metering plunger 17 ceases. A very low spring rate bias spring 55 is provided between the opposing surfaces of the two plungers and within the timing plunger chamber 26 so as to counteract the inertial effects of the motion of the metering plunger 17 and bring the metering plunger to a full and precise stop. Thus, a precise and metered volume of fuel is admitted into the metering plunger chamber 33 and maintained during the remainder of the metering stroke. The spring 55 also tends to induce a slight pressure on the metering chamber 33 through the metering plunger 17 and thus encourages the check ball 35 to fully seat and seal the chamber 33 The timing plunger 16 continues to move upward independently of the coupling member 20 away from the now suspended metering plunger 17 under the force of the fuel pressure entering the plunger chamber 26. The volume of timing plunger chamber 26 increases as it is filled with fuel at the fuel rail pressure of 150 psi. After the top of the metering stroke is reached, another injection stroke begins as explained above.

Figure 2:
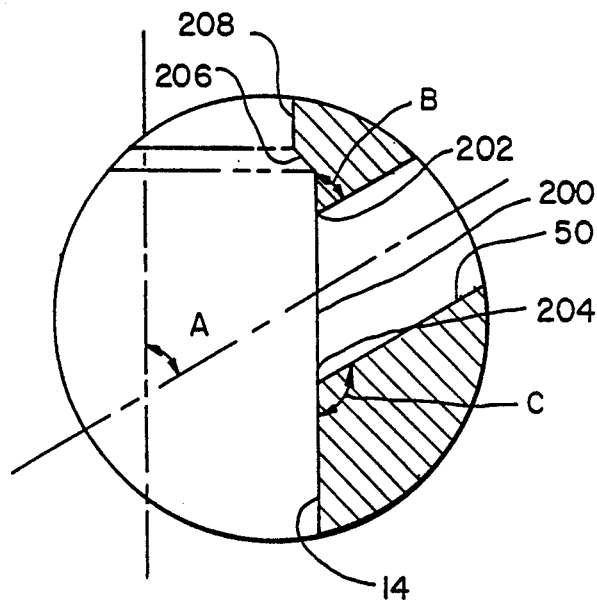
FIG. 2 is an enlarged, fragmentary cross-section similar to FIG. 5, showing the intersection of the timing chamber and control passage bores in the injector body before they are modified by machining the intersection between their walls.
Figure 3:
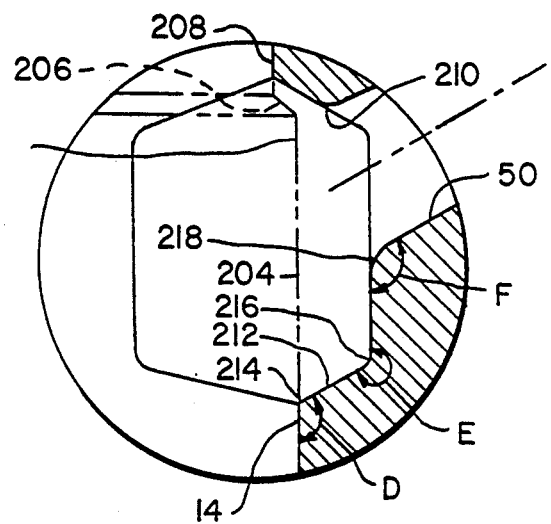
FIG. 3 is a view similar to FIG. 2, showing the intersection of the timing chamber and control passage bores in the injector body after they are modified by machining the intersection between their walls according to the present invention.

The present invention is shown particularly by comparing FIGS. 2 and 3. FIG. 2 shows an injector body which has not yet been modified according to the present invention. The differences between FIG. 2 and FIG. 3 illustrate the present invention.

Referring first to FIG. 2, the bore 14, running axially and defining the timing chamber of the injector body, intersects at an acute angle with the generally radial control passage defined by the bore 50 which runs axially as well as radially. More broadly speaking, the bore 50 could be any auxiliary bore in the injector body 10 which intersects with the bore 14 and is exposed to injection pressures. The diameter of the bore 14 is preferably less than 20 mm., and in some cases less than 10 mm. The bore 50 is typically smaller than the bore 14, and preferably has a diameter of less than 5 mm. in this embodiment. The bores 14 and 50 define a fuel flow path in the injector body 10. The intersection of the bores 14 and 50, or more precisely the intersection of their axes, defines an angle A, shown as an angle of approximately 60 degrees in FIG. 2. The walls of the bores 14 and 50 intersect along a nearly circular but nonplanar closed loop designated herein as the intersection 200.

When the axes of the bores intersect at the angle A, the apex indicated as a point 202 on the line of intersection 200 also defines an angle B between the walls of the bores 14 and 50, and the apex indicated as a point 204 diametrically opposed across the bore 50 defines an angle C, here about 120 degrees, between the walls of the bores 14 and 50.

When the bores 14 and 50 are drilled by high pressure drilling, the line of intersection 200 is a sharp edge having substantially no radius, and is sharpest at the apex 202. When the bores 14 and 50 are filled with pressurized, flowing fuel, the apex 202 is a site of high stress concentration. As the result of metal fatigue when the fuel injector is in service, cracks propagate in the body 10 from or near the apex 202, resulting in failure of the body 10. FIG. 2 also shows that in this embodiment the bore 50 is intersected by a coaxial transition 206 and bore 208.

Figure 4:
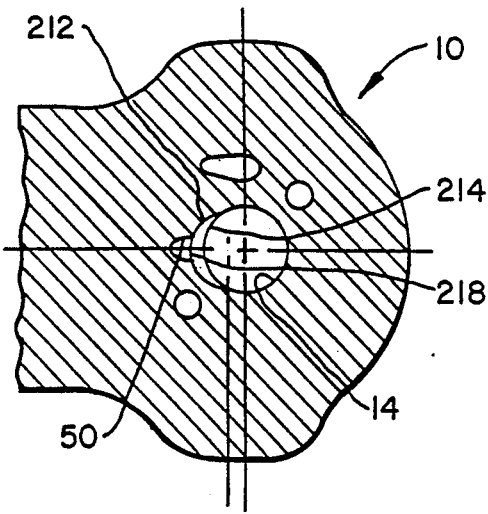
FIG. 4 is an isolated radial sectional view of the injector body, taken along line 4—4 of FIG. 1.

FIGS. 3 and 4 illustrate the intersection 200, particularly near the apex 202, machined to reduce the concentration of stress. In FIG. 3, the original apexes 202 and 204 are machined away. The original transition 206 between the bore 14 and the bore 208 is also machined away immediately adjacent to the intersection of the bores 14 and 50. In the structure which remains, the intersection between the bores 50 and 208 is a smooth, gently curved radius 210. The radius 210 may be more than 0.2 mm., and preferably at least 0.5 mm. The provision of this large radius 210 and removal of the originally sharp apex 202 greatly reduces the degree of stress concentrated on the injector body 10 and greatly extends the typical working life of the injector body 10.

Another feature shown in FIGS. 3 and 4 is a machined pocket 212 recessed into the wall of the bore 14, forming with the radius 210 an enlarged mouth of the bore 50 where it meets the bore 14. Since fuel flows both ways through the intersection of the bores 14 and 50 during each injection cycle, the provision of the pocket 212 reduces the resistance of the bores 14 and 50 to such bidirectional flow. The pocket 212 has three transitions—214, 216, and 218 (respectively defining internal angles D, E, and F, of approximately 120 degrees, approximately 240 degrees, and approximately 120 degrees between the intersecting walls of the bores 14 and 50). The angles D, E, and F are each obtuse instead of acute. Each of these transitions, particularly 216 and 218, is radiused to reduce stress concentration. The problem of stress concentration is greatest at the most acute local angle of intersection between the walls of the bores 14 and 50, so the largest radius transition is radius 210.

In FIG. 4, the radial extent of the pocket 212 with respect to the axis of the bore 14 is illustrated. The machining of the pocket 212 is confined to a sector approximately facing the bore 50 in this embodiment.

Other portions of the line of intersection 200 between the original apexes 202 and 204 are also machined according to the present invention to reduce stress concentration, particularly portions which approach the point 202.

Another aspect of the invention is a method for machining the radius 210 and the pocket 212 after the bores 14 and 50 are drilled. This machining is complicated by the minimal access to the line of intersection 200 from outside the injection body 10. The line of intersection 200 can only be approached through one of the bores. Here, the bore 14 (which provides the best access in this situation) has a diameter of less than 20 mm., and possibly less than 10 mm, and the pocket 212 is more than 20 mm. from the outside end of the bore 14, thus providing too little room for a conventional milling tool to be inserted and used, particularly if the tool must be maneuvered within the bore 14 to complete the machining operation. To solve this problem, the present invention uses an electrochemical machining process.

Figure 5:
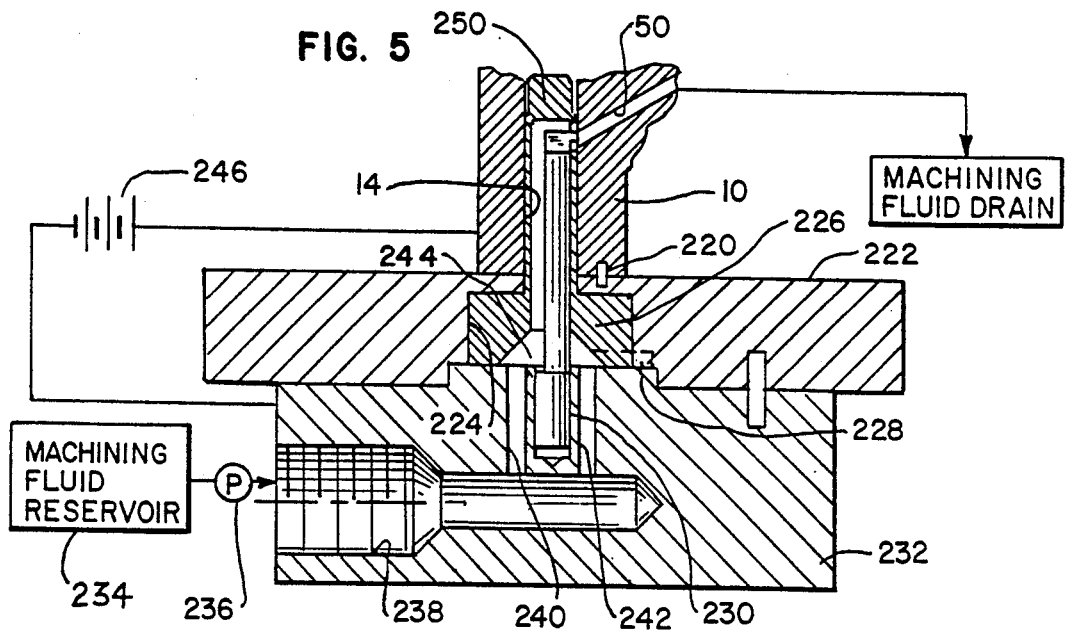
FIG. 5 is a reversed cross-section of the injector body of FIG. 1 on an electrochemical machining fixture positioned to machine the intersection between the timing chamber and control passage bores of the body.
Figure 6:
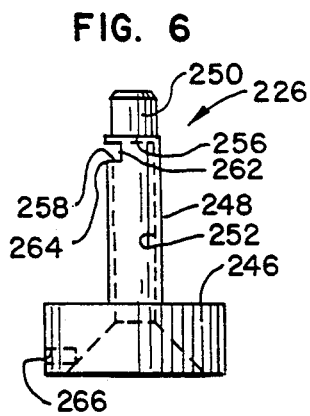
FIG. 6 is an isolated side elevation of the mask shown in FIG. 5.
Figure 7:
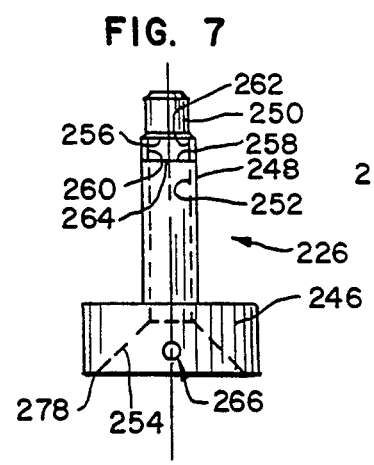
FIG. 7 is an orthogonal side elevation of the mask of FIG. 6.
Figure 8:
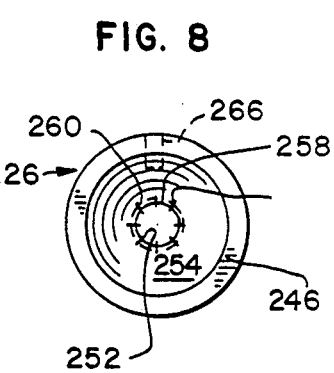
FIG. 8 is a bottom plan view of the mask of FIG. 6.

FIGS. 5–11 show an electrochemical milling fixture adapted to machine the radius 210 and the pocket 212 simply, accurately, and rapidly. Referring first to FIG. 5, the injector body 10, of which only the fragment surrounding the bore 14 is shown, is supported and located in a precise orientation by locating pins 220 on an insulated table 222 made of phenolic resin or other suitable nonconductive material. The table 222 has an orifice 224 which receives a mask 226 made of polyvinyl chloride or other suitable nonconductive material. The mask 226 is positioned with respect to the table 222 by a pin 228. An electrode 230 made of brass or other compatible material extends within the mask 226 and is anchored in a plenum block 232. A machining fluid reservoir 234 and pump 236 supply machining fluid, typically a brine of sodium chloride in water, through the passages 238, 240, and 242 to the space 244 between the mask 226 and the electrode 230. A rectifier or other source of DC current, schematically shown as a battery 246, generates a potential between the injector body 10 and the electrode 230. The negative electrode 230 is in intimate electrical contact with the fluid in the space 244 and with the plenum block 232.

Referring to FIGS. 5–8, the mask 226 comprises a base 246 and a probe 248 terminating in an integral plug 250. A bore 252 extends from a mouth 254 to the base of a lip 256 under the plug 250. A window 258 which is rectangular in side elevations extends circumferentially between the edges 260 and 262, extends axially between the lip 256 and the edge 264, and provides communication through the wall of the bore 252. A bore 266 in the base 246 receives the pin 228 shown in FIG. 5.

Referring to FIGS. 2 and 5–8, the window 258 is generally aligned with the region of the intersection 200 to be machined when the injector body 10 is on the electrochemical machining fixture. In this embodiment, when the body 10 is on the fixture, the lower edge 264 of the window 258 lies between the apexes 202 and 204, closer to the former than the latter. The upper lip 256 of the mask is enclosed by the lower end of the bore 208, above the transition 206. The edges 260 and 262 of the window have a circumferential separation of about 100 degrees in this embodiment and the window 258 squarely faces the bore 50. The clearance of the probe 248 in the bore 14 and the clearance of the plug 250 and the lip 256 in the bore 208 are each very slight, effectively sealing off the regions above the window 258 and below the apex 204 against the influx of fluid from the reservoir 234 through the bore 252 and window 258.

Figure 10:
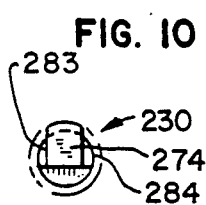
FIG. 10 is a top plan view of the electrode of FIG. 9.
Figure 9:
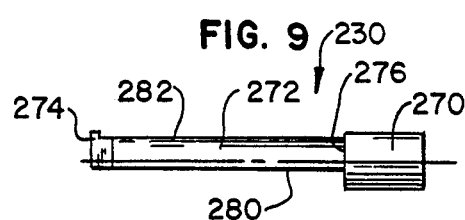
FIG. 9 is an isolated side elevation of the electrode shown in FIG. 5.
Figure 11:
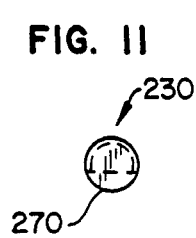
FIG. 11 is a bottom plan view of the electrode of FIG. 9.

Referring now to FIGS. 4 and 9–11, the electrode 230 is a machined rod, and comprises a base 270, a shaft 272, and a lip 274. The base 270 has a shoulder 276 which abuts against the lip 278 of the mask 226 (FIG. 7) to locate the electrode 230 with respect to the mask 226. When they are so located, the lip 274 is slightly beneath the lip 256 of the mask 226 and well above the lower edge 264 of the window 258. The shaft 272 is flattened on the side 280 opposite the lip 274 and slightly reduced in diameter on the side 282 beneath the lip 274, creating a fluid reservoir around the shaft 272. This reservoir facilitates the necessary intimate electrical contact of the fluid in the reservoir with the electrode 230. With reference to FIG. 10, the electrode 230 has shoulders 283 and 284 defining notches on each side of the lip 274.

The flow of electrolyte through the fixture and the injector body 10 during machining is as follows. The principal flow is directed between the lips 256 and 274 and through the window 258, where it directly impinges upon and quickly erodes the apex 202 (FIGS. 2 and 3) and then continues up the bore 50 and out of the injector body 10. The flowing electrolyte carries away the waste resulting from the machining operation. A secondary flow of electrolyte to form the pocket 212 proceeds between the lip 274 and the lower edge 264 of the window 258, through the lower part of the window. A tertiary flow of electrolyte proceeds across the shoulders 283 and 284, then through the window 258, then circumferentially inward across the pocket 212. The secondary and tertiary flows also drain through the bore 50.

In one embodiment of the invention, the illustrated apparatus is used to machine a drilled forged steel injector body 10, providing the radius and pocket 210 and 212 described and illustrated herein, using a voltage of about 22 volts (measured at the power supply), an electrolyte composed of about 15% (volume solute per volume solution) sodium chloride in water, an electrolyte temperature of about 80 degrees Fahrenheit (27 degrees C.), an electrolyte pressure of about 100 psi (69 Newtons per square centimeter), and a machining time of about 60 seconds. Other machining conditions and mask and electrode configurations can be devised to provide different machined configurations. After the electrochemical machining step is concluded the injector body 10 is rinsed thoroughly and dried to remove any residual electrolyte. The surface left by the machining operation is highly polished with large blend radii.

What is claimed is:

1. A fuel injector for an internal combustion engine, said fuel injector comprising:
    an injector body defining a centrally-located, axially-extending, generally cylindrical main bore having an inside wall and a longitudinal center-line axis, said injector body further defining a generally cylindrical side bore having an inside wall and a longitudinal center-line axis which intersects said longitudinal center-line axis of said main bore within the injector body, said side bore being disposed in fuel flow communication with said main bore;
    fuel control means disposed within said injector body; and
    wherein the position and orientation of said main bore and of said side bore are such that the main bore and the side bore intersect, and their intersection defines an acute included angle between the intersection of their longitudinal center-line axes, such that the inside wall of said main bore and the inside wall of said side bore are separated by a portion of said injector body and connected by a convex radiused surface having a radius of at least 0.2 mm.

2. A fuel injector for an internal combustion engine, said fuel injector comprising:
    a body having a fuel flow path defined by a first generally cylindrical bore having a longitudinal center-line axis intersected at an acute included angle by the longitudinal center-line axis of a second generally cylindrical bore, the intersection of said axes being located within said body, said second bore having a bored-surface sidewall which directly extends into a convex radiused surface at the point of termination of said bored-surface sidewall, said convex radiused surface having a radius of at least 0.2 mm and being disposed in the region of said body defined by said acute included angle and connecting the bored-surface sidewall of said second bore with a sidewall of said first bore.

3. A fuel injector for an internal combustion engine, said fuel injector comprising:
    a body defining a first generally cylindrical bore having a longitudinal center-line axis and a second generally cylindrical bore having a longitudinal center-line axis, said first bore axis being intersected at an acute angle by said second bore axis at a location within said body, said first bore and said second bore defining a fuel flow path, wherein a wall surface defining said first bore and a wall surface defining said second bore are separated from each other by an interface portion which is connected to the wall surface of said second bore by a convex radiused surface having a radius of at least 0.2 mm.

4. A fuel injector for an internal combustion engine, said fuel injector comprising:
    an injector body defining an axially-extending, generally cylindrical main bore having a longitudinally-extending geometric center-line axis, said injector body further defining a generally cylindrical side bore having a longitudinally-extending geometric center-line axis which intersects the longitudinally-extending axis of said main bore within said injector body;
    fuel control means disposed within said injector body; and
    wherein the position and orientation of said main bore and of said side bore are such that the main bore and the side bore intersect and their intersection defines an acute included angle between the longitudinally-extending axis of said main bore and the longitudinally-extending axis of said side bore, said included angle being greater than 30 degrees and wherein said main bore and said side bore being separated from each other by a radiused interface surface disposed within said included angle and having a radius of at least 0.2 mm.

* * * * *